United States Patent [19]

Sundstrand

[11] 3,977,738

[45] Aug. 31, 1976

[54] SUPPORTING BEARING

[75] Inventor: Arne Sundstrand, Vasteras, Sweden

[73] Assignee: Allmanna Svenska Elektriska Aktiebolaget, Vasteras, Sweden

[22] Filed: Aug. 21, 1975

[21] Appl. No.: 606,595

[52] U.S. Cl. .............................. 308/134.1; 308/168; 308/174
[51] Int. Cl.² .......................................... F16C 1/24
[58] Field of Search ............ 308/15, 22, 134.1, 168, 308/169, 170, 171, 172

[56] References Cited
UNITED STATES PATENTS

| | | | |
|---|---|---|---|
| 3,659,674 | 5/1972 | Ferrarlo | 308/134.1 X |
| 3,917,364 | 11/1975 | Kuhn | 308/134.1 X |

*Primary Examiner*—M. H. Wood, Jr.
*Assistant Examiner*—Gene A. Church

[57] ABSTRACT

A supporting bearing for a rotary vertical shaft includes a supporting bearing member attached to the shaft and arranged coaxially therewith. The supporting bearing member has an inner cylindrical surface arranged with a radial clearance with respect to the shaft and a downwardly-facing annular slide face bearing against a stationary bearing body. The cylindrical surface surrounds an annular space which contains a liquid lubricant and is limited radially inward by a stationary screen surrounding the shaft. The screen is formed of an inner hollow cylinder and an outer hollow cylinder arranged coaxially with respect to the inner hollow cylinder and with a radial clearance therebetween. The outer hollow cylinder is provided with holes facing the cylindrical surface which surrounds the annular space.

1 Claim, 3 Drawing Figures

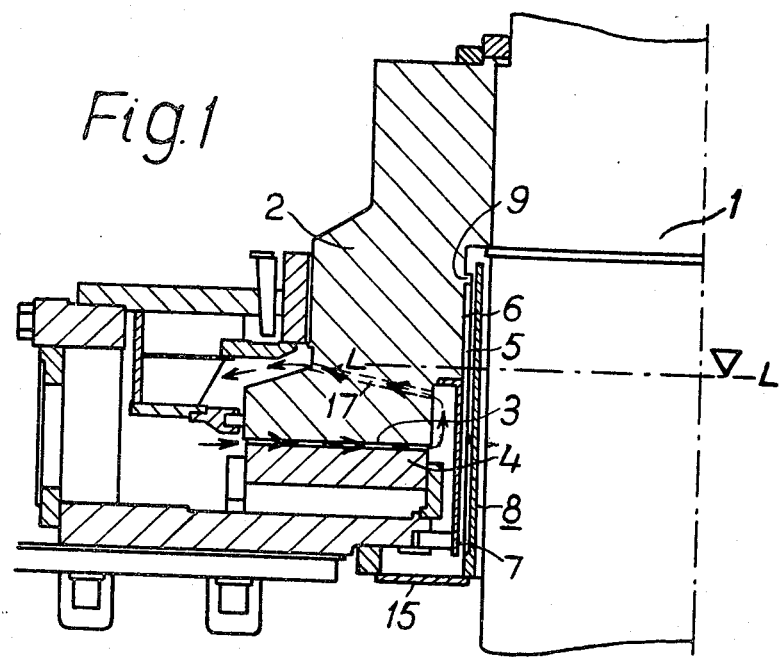
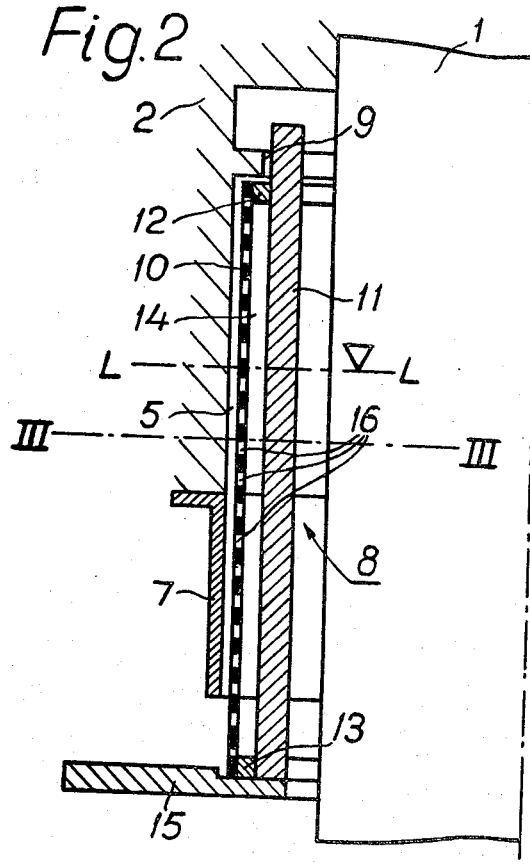
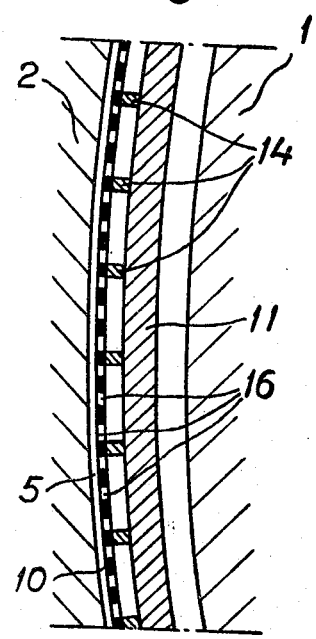

SUPPORTING BEARING

BACKGROUND OF THE INVENTION

1. Field of the Invention

The present invention relates to a supporting bearing means for a rotary vertical shaft, comprising a supporting bearing member attached to the shaft and arranged coaxially with respect to said shaft, said supporting bearing member having an inner cylindrical surface arranged with a radial clearance with respect to the shaft and a downwardly-facing annular slide face bearing against at least one stationary bearing body, said cylindrical surface surrounding an annular space containing liquid lubricant and being limited radially inwardly by means of a stationary screen surrounding the shaft.

2. The Prior Art

The above-mentioned stationary screen, which is hereafter called the "sleeve", constitutes the inner sealing wall for an annular oil chamber in which the supporting bearing works. Between the sleeve and the supporting bearing body there is formed an annular gap. As the supporting bearing body rotates, the oil is forced into the gap through friction in the oil. When certain critical speeds are achieved, unstable conditions and turbulence arise in the oil and the oil is thrown out beyond the sleeve. The turbulence can be counteracted by reducing the gap. If an unstable flow is to be avoided when the oil is of the usual vescosity and the gap has the usual linear speed, the width of the gap may be 2 mm at the most. Taking into consideration that sleeve diameters of more than 2 m are very common, it is clear that the provision of a sufficiently small gap may involve great difficulties from the point of view of manufacture.

Furthermore, it has been found that the small gap width — which is a condition for laminar flow — involves great sensitivity to jerks of the shaft. Jerks will result in variation of the gap width between a minimum value and maximum value so that a pumping effect arises in the gap. If the gap width then is small, the pulsating pressure increases will be so great that oil may easily be pumped out of the gap.

SUMMARY OF THE INVENTION

The above drawbacks are avoided in a supporting bearing means according to the invention by making the sleeve as a double-wall construction, the side facing the oil being perforated.

BRIEF DESCRIPTION OF THE DRAWINGS

The invention will be described in the following with reference to the accompanying schematic drawing, in which FIG. 1 shows in axial section a portion of a bearing means according to the invention positioned on one side of a bisecting axial plane, FIG. 2 is a detail of FIG. 1 and FIG. 3 shows a horizontal section along the line III-—III of FIG. 2.

DESCRIPTION OF THE PREFERRED EMBODIMENTS

In the drawing, 1 designates the shaft of a generator and 2 a heel-shaped body of a supporting bearing surrounding the shaft and attached to it. The bearing body 2 is provided with a downwardly-facing, annular slide face 3 bearing against a plurality of bearing segments 4 which are immersed in oil. The dot-and-dash line L — L indicates the oil level. The oil-filled space communicating with the slide face 3 consists, among other things, of a hollow cylindrical space 5 which is limited radially outwardly by a cylindrical surface, which consists of a cylinder surface 6 of the bearing body 2 as well as of a surface of a thin-walled ring 7 mounted on said bearing body 2. Radially inwardly the hollow-cylindrical oil space 5 is limited by a stationary, hollow cylindrical screen 8 which, at its upper edge, is sealed against the bearing body 2 by means of a sealing flange 9. At the lower edge of the screen 8 the space 5 communicates with the other parts of the oil space. The screen 8 contains a thin-walled, perforated hollow cylinder 10 which is joined by welding to a hollow cylinder 11 having thicker walls, which is surrounded by said perforated hollow cylinder 10, through two rings 12 and 13 and a large number of bars 14 constituting spacers radially between the two hollow cylinders 10 and 11. The holes 16 in the hollow cylinder are directed towards the cylindrical surface formed on the bodies 2 and 7. At its lower end the screen 8 seals against an annular bottom portion 15 of the oil space.

A plurality of channels 17 constitute a return path for the oil flowing through the bearing.

The distance between the perforated hollow cylinder 10 and the body of the supporting bearing 2 is made so small that turbulence in the rotating oil is avoided, and the distance constitutes only a fraction of the distance between the two hollow cylinders 10 and 11.

The perforation of the hollow cylinder 10 may be made in such a way that the holes constitute at least 10% and at the most 60% of the total area.

I claim:

1. Supporting bearing means for a rotary vertical shaft (1) comprising a supporting bearing member (2+7) attached to the shaft and arranged coaxially with respect to said shaft, said supporting bearing member having an inner cylindrical surface arranged with a radial clearance with respect to the shaft and a downwardly-facing, annular slide face (3) bearing against at least one stationary bearing body (4), said cylindrical surface surrounding an annular space (5) which contains liquid lubricant and a stationary screen (8) surrounding the shaft and forming an inner limiting wall of said space, said screen comprising an inner hollow cylinder (11) and an outer hollow cylinder (10) arranged coaxially with respect to said inner hollow cylinder (11) and with a radial clearance with respect to it, said outer hollow cylinder (10) being provided with a plurality of through holes directed towards said cylindrical surface.

* * * * *